May 20, 1958    H. M. DODGE    2,835,313
CELLULAR ELASTIC CUSHION
Filed Feb. 27, 1956
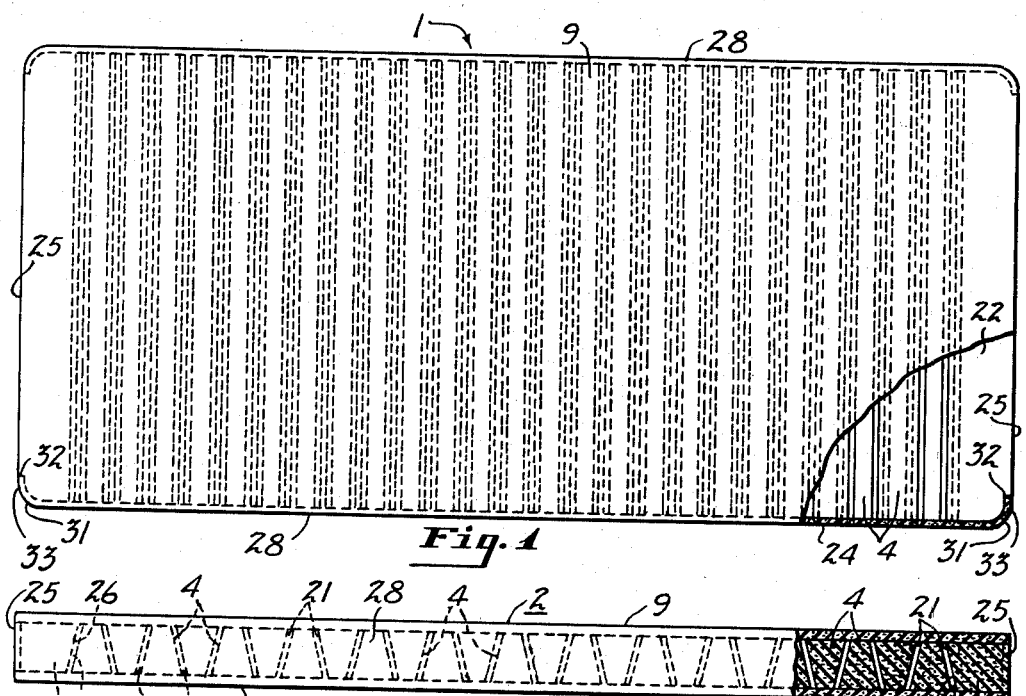
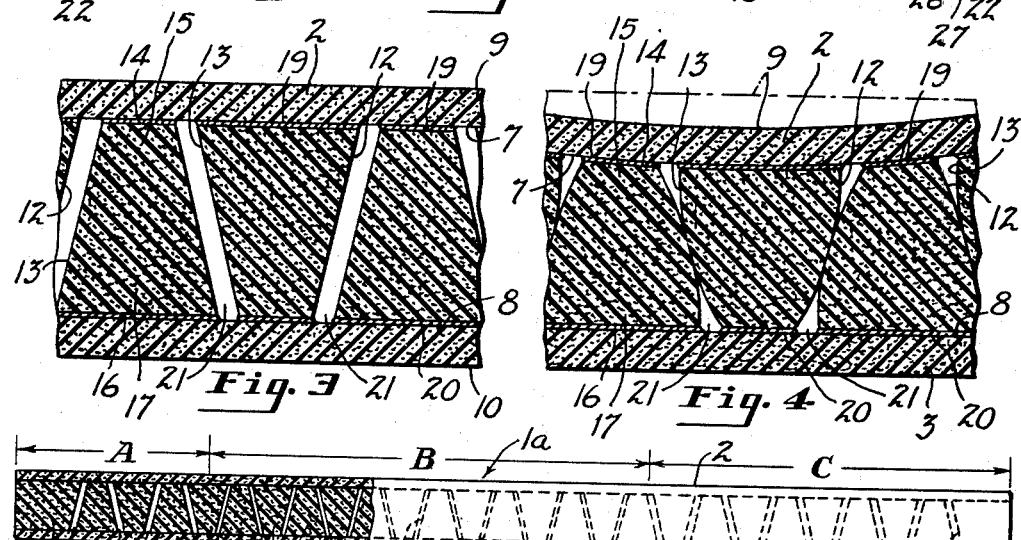
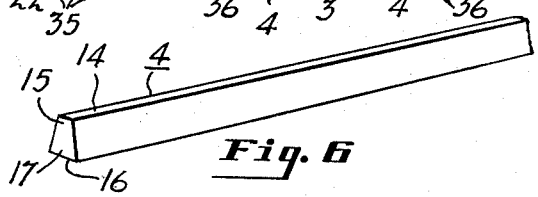
INVENTOR
Howard M. Dodge
BY McCoy, Greene & LeBlanc
ATTORNEYS

United States Patent Office 2,835,313
Patented May 20, 1958

2,835,313

CELLULAR ELASTIC CUSHION

Howard M. Dodge, Marion, Ind., assignor to The General Tire and Rubber Company, Akron, Ohio, a corporation of Ohio Application February 27, 1956, Serial No. 567,857

9 Claims. (Cl. 155—179)

This invention relates to improved cellular mattresses, cushions, or the like and more particularly to cushions of cellular polyurethane rubber suitable for use in mattresses, chairs, and seats of automobiles, buses, trains, and airplanes.

Up to the present invention cellular elastic polyurethane has been unsatisfactory for the molding of other cushions, since it usually form a hard crust and a dense surface adjacent the cores and other portions of the forming mold.

In accordance with this invention, a polyurethane cushion of simple inexpensive construction is provided by cutting a plurality of flexible cellular spacers from sheets of cellular polyurethane from which the hard crust has been removed and thereafter cementing the spacers to flexible top and bottom walls which may also be cut from said sheets.

According to the present invention, a series of cellular elastic spacers are employed between the top and bottom walls of the cushion to provide an effective cushioning action. The spacers are spaced apart so that little weight is required to initially compress the spacers. However, substantially greater loads on the cushion compress the spacers so that they move into engagement and reinforce themselves to increase the resistance to further compression.

The spacers preferably have top and bottom portions of different thicknesses and are preferably arranged so that the narrow portion of one spacer is adjacent to the wide portion of the adjacent spacers. With such a construction the spaces between the spacers are inclined in different directions so as to minimize relative horizontal movements of the top wall with respect to the bottom wall tending to collapse the cushion.

Adjacent spacers are preferably arranged so that the intermediate portions thereof remain out of engagement until said spacers are compressed vertically an amount not substantially less than about 5% of their normal height and move into engagement before said spacers are compressed substantially more than about 25% of said height.

The cellular elastic spacers may be of various shapes but are preferably wedge-shaped or generally trapezoidal and preferably have a uniform cross section throughout their length. The spacers are preferably separate from, rather than integral with the top and bottom walls, and are preferably longitudinally straight, rather than circular, so that they may be readily cut from strips of cellular elastic polyurethane rubber.

The average width of the spaces between adjacent spacers may be varied to obtain a cushion of the desired stiffness but should be less than about one-half the average width of the spacers and is preferably about 10% to 20% of the average width of the spacers. The spaces themselves may have various cross-sectional shapes but each space is preferably of substantially uniform width throughout its height and is preferably inclined with the vertical about 15° to 45°, although best results are obtained when it is inclined at an angle of about 20° to 40°.

It is an object of this invention to produce a mattress or cushion that deforms readily under light load and small deflection, but which is reinforced at high deflection and high load.

Another object of this invention is to provide a soft comfortable cushion of simple inexpensive construction which can be made of cellular elastic polyurethane rubber.

Other objects, uses and advantages of the present invention will be apparent from the following description and claims and from the accompanying drawings in which:

Figure 1 is a top plan view on a reduced scale of a mattress constructed in accordance with the present invention with a portion of the top wall broken away to show the corner construction;

Figure 2 is a side elevational view of the mattress on a reduced scale with parts broken away and shown in vertical cross-section;

Figure 3 is a fragmentary longitudinal vertical sectional view of the mattress on a larger scale;

Figure 4 is a fragmentary longitudinal vertical sectional view similar to Figure 3 and on the same scale showing the general shape of the mattress when it is under compression;

Figure 5 is a side elevational view similar to Fig. 2 showing a modified from of a mattress which is substantially the same as the mattress of Figs. 1 to 4, except for the spacing between the spacers; and Figure 6 is a fragmentary prospective view on a reduced scale showing one of the cellular elastic spacers employed in the mattresses of Figs. 1 to 5.

Referring more specifically to the drawings wherein like parts are identified by the same numerals throughout the several views, Figs. 1 to 4 show a mattress 1 comprising a rectangular flexible top wall 2 of cellular elastic material, a rectangular bottom wall 3 spaced from and parallel to the top wall, and a series of parallel cellular elastic spacers 4 held in a predetermined spaced relation between the top and bottom walls. The top and bottom walls of the mattress shown herein are made of the same cellular elastic material, are of the same size and shape, and are provided with normally flat parallel inner flexible surfaces 7 and 8, respectively that extend substantially the full width and length of the mattress and normally flat outer surfaces 9 and 10, respectively, that are parallel to said inner surfaces.

The spacers 4 are preferably normally wedge-shaped or trapezoidal in vertical cross section to provide lateral stability and are spaced apart so that the central portions of adjacent spacers remain out of engagement until said adjacent spacers are compressed vertically an amount not substantially less than about 5 percent of their normal vertical height. However, the spacers are preferably sufficiently close together so that the central portions of adjacent spacers move into engagement before said spacers are compressed more than about 25 percent of their normal vertical height. The average distance between adjacent spacers is preferably not substantially greater than about one-half the average horizontal width of said spacers.

As herein shown, each spacer 4 is of the same size and shape and has a uniform cross section throughout its length in the form of an isosceles trapezoid, the narrow portion 15 of each spacer being placed opposite the wide portion 17 of an adjacent spacer so that the spaces on the opposite sides of each spacer are inclined in opposite directions. Each spacer 4 has flat parallel narrow and wide horizontal rectangular faces 14 and 16, respectively, and flat rectangular side faces 12 and 13 of the same size which are inclined the same amount and in opposite directions relative to the vertical. Each of the side faces 12 and 13 is preferably inclined at an angle of about 15 to 45 degrees relative to the vertical, and best results are usually obtained when said angle is about 20 to 40 degrees.

Suitable means are provided for holding the spacers 4 in a predetermined spaced relation. Such means preferably comprises thin layers 19 and 20 of a suitable adhesive cement applied to the top and bottom walls, respectively, to bond the spacers to said walls as best shown in Figs. 3 and 4.

The spacers 4 may be arranged in various ways, depending on the intended use for the cushion, but they are usually arranged in parallel relation and spaced apart so that the average horizontal width of the space between adjacent spacers is not substantially greater than about one-half the average horizontal width of said adjacent spacers. The preferred average width of the space between adjacent spacers is usually about 10 to 20 percent of the average horizontal width of the spacers, but the average width may be larger than this if an extremely soft cushion is desired.

As shown in Figs. 1 to 3, the spacers 4 of the resilient cushion 1 are parallel and equally spaced along the length of the cushion to provide a series of transverse spaces 21 of the same horizontal width, the adjacent spaces being inclined in opposite directions. Since each side face 12 is parallel to the adjacent side face 13 of the next spacer, each space 21 shown herein has a uniform horizontal width throughout its length and vertical height.

The end and side walls of the mattress are formed by an identical pair of end spacers 22 of the same length and height as the spacers 4 having the same trapezoidal cross section substantially throughout their lengths and by an identical pair of uniformly thin flexible rectangular strips 28 of a suitable plastic or rubber-like material having a uniform width equal to the height of the spacers 4. Each spacer 22 has a flat vertical rectangular side face 25 flush with the adjacent end faces of the top and bottom walls 2 and 3 and forming the end wall of the mattress and has a flat rectangular side face 26 parallel to the side face of the adjacent spacer 4 and spaced therefrom to provide a space 27 near the end of the mattress of the same size as the spaces 21.

The opposite ends of each spacer 22 are formed to provide recesses 32 for receiving the end portions of the strips 28 and round end portions 33 for engaging the strips. The spacers 22 are sandwiched between and cemented to the top and bottom walls 2 and 3 like the spacers 4, and the strips 28 are cemented to the ends of the spacers 4 with their outer faces flush with the vertical side faces of said top and bottom walls, the opposite end portions of each strip 28 being cemented to the end portions 33 of the end spacers. The recesses 32 are of such size that the rounded outer surfaces 31 of the strip end portions are tangent to the vertical side faces 25 of the end spacers as indicated in Fig. 1.

Figures 2 and 3 show the mattress 1 in its normal unstressed condition wherein the spacers 4 and 22 are trapezoidal. Figure 4 shows how the mattress 1 may appear at the instant the central portions of adjacent spacers 4 move into engagement due to compression of the mattress under load. The mattress of the present invention is constructed so that adjacent spacers must be compressed to a height that is about 75 to 95 percent of their height in the normal unstressed condition before their central portions move into engagement. Where the spacers are widely separated, the cushion is very soft, since adjacent spacers do not move into engagement to reinforce themselves until the cushion is deformed a large amount. The stiffness of the cushion may be increased by reducing the spacing between the spacers.

The preferred material for all of the parts of the mattress including the walls 2 and 3, the spacers 4 and 22, and the strips 28, is cellular elastic polyurethane rubber, which is an elastomer formed as a reaction product of a polyisocyanate and a polyester and/or a polyether. The preferred foamed polyurethane rubber is one produced by dissolving or dispersing an easily liquified gas such as difluoromonochloromethane or difluorodichloromethane into a suitable polyglycol and thereafter reacting the polyglycol with a diisocyanate as, for example, described in the copending application of Charles B. Frost, Serial No. 541,823 filed October 20, 1955 and assigned to assignee of the present application.

It will be apparent that the distance between the wedge-like spacers of the cushion of the present invention may be varied considerably and need not be uniform in any given cushion. Figure 5 shows a modified form of mattress 1a formed from the top and bottom walls 2 and 3, the laterally extending spacers 4 and 22, and the side strips 28. The mattress 1a may be exactly the same as the mattress 1 and may be cemented together in the same manner, but the spacers at the central hip and shoulder region B of the mattress are more closely spaced than the spacers at the head region A or the foot region C so that the mattress has greater stiffness at said region B where the expected load will be greatest. As shown herein, the parallel spacers 4 and 22 in the head region A are widely separated to provide a series of spaces 35, each of relatively large horizontal width. The parallel spacers 4 in the hip and shoulder regions B, however, are closer together so as to form a series of spaces 36 of relatively small horizontal width. The parallel spacers 4 and 22 in the foot region C are widely separated so as to form a series of spaces 37 having a horizontal width substantially greater than that of the spaces 36. If desired the spaces 37 may have a horizontal width equal to or greater than the width of the spaces 35. However, it will be understood that the spaces 35 and 37 are preferably not so large that adjacent spacers in the head region A or the foot region C are out of engagement when said spacers are compressed to less than 75 percent of their normal unstressed height. Also, the spaces 36 are preferably sufficiently large so that adjacent spacers in region B are out of engagement before they are compressed to less than about 95 percent of their normal height.

Except for the distances between adjacent spacers, the mattress 1a is identical to the mattress 1. However, when a person is in a reclining position on the mattress 1a his head and feet rest on the softer portions A and C of the mattress so that the person is somewhat more comfortable than he would be if resting on the mattress 1.

The mattresses 1 and 1a may be made of highly resilient cellular materials such as natural or butadiene-copolymer latex foam, less resilient materials such as polyvinylchloride or polyurethane foam, or other suitable material including both open- and closed- cell type materials or a combination of different cellular materials. However, variations in density and chemical composition will result in a range of compression-deflection values or load-carrying capacities. The trapezoidal wedge-shape construction of the present invention affords a very wide range of load-deflection characteristics, and due to its spring action imparts a soft cushioning action to less resilient cellular materials, such as polyvinylchloride or polyurethane foams.

The cushion of the present invention may be made by pouring of the cellular material in a mold or by other methods to achieve the trapezoidal construction.

However, more of the advantages of the invention are realized where the mattress is made of pieces of polyurethane which are cut to eliminate any hard crust that may be formed during molding. The mattresses 1 and 1a shown herein are formed from such pieces which are cemented together to form the completed mattress. Since the top and bottom walls 2 and 3 and the trapezoidal spacers 4 are relatively easy to cut from a block of polyurethane and are easy to assemble, the mattresses 1 and 1a are relatively inexpensive.

An examination of the drawings will indicate the many variations in construction which are possible to produce a wide range of load-deflection values. Variation in thickness or density of the top and bottom walls 2 and 3, width of the horizontal spacer surfaces 14 and 16, inclination of the side surfaces 12 and 13, height or density of the spacers 4, and width of the spaces between the spacers afford a wide range of construction. The following example, which is given by way of illustration rather than limitation, shows the effects of changes in the spacing of the spacers and of changes in the density of the polyurethane foam rubber.

*Example 1*

Three rectangular mattresses similar to the mattress 1a shown herein were made from elastic polyurethane foam rubber, each mattress being made of a normal twin-bed size with a uniform length of 76 inches, a uniform width of 39 inches, and a uniform height of about 4½ inches. The top and bottom walls 2 and 3 each mattress were cut to the same size from pieces of soft polyurethane foam having a substantially uniform density of 2.2 pounds per cubic foot, each wall having a uniform thickness of ¾ inch, a length of 76 inches and width of 39 inches. The spacers 4 of each mattress were cut to the same size from a slab of soft polyurethane foam of substantially uniform density, each spacer having a length of about 39 inches and a uniform cross section throughout its length in the form of an isosceles trapezoid 2¾ inches high having bases of 1½ inches and 2¾ inches. However, the density of the urethane foam used for the spacers of the third mattress was varied as indicated in the table below. The spacers of each mattress were cemented to the top and bottom walls generally in the manner indicated in the drawings so that the mattress had a head region 25 inches long, a central hip and shoulder region 26 inches long, and a foot region 25 inches long, the spacers being equally spaced within each region and more widely spaced in the central region than in the head and foot regions. The compression-deflection values were determined with a Scott tester using a circular foot plate with an area of 50 square inches, the force in pounds required to deflect the mattress in each region of each mattress the same distance being recorded as indicated below.

| Type of Mattress | Total Wt. of Mattress | Spacers, density of foam, lb./ft.³ | Average Width of spaces between spacers | | Compression-deflection, pounds | | |
|---|---|---|---|---|---|---|---|
| | | | Foot and Head | Hip and Shoulder | Head Region | Hip and Shoulder Region | Foot Region |
| | | | Inches | Inches | | | |
| Soft | 13 | 2.2 | ¾ | ½ | 18 | 20 | 18 |
| Medium | 14.5 | 2.2 | ¼ | ⅛ | 25 | 27 | 25 |
| Firm | 22 | 2.8 | ¼ | ⅛ | 32 | 36 | 33 |

The above table clearly illustrates the change produced in compression by merely changing the width of the spaces between the spacers as between the soft and medium mattresses. A marked change in compression-deflection is also noted by increasing the density of the spacers, as in the case of the firm mattress.

It is to be understood that, in accordance with the provisions of the patent statutes, the particular form of product shown and described and the particular procedure set forth are presented for purposes of explanation and illustration and that various modifications of said product and procedure can be made without departing from my invention.

Having thus described my invention, I claim:

1. A mattress or the like comprising generally horizontal top and bottom walls, said top wall being made of a flexible cellular elastic material, and a series of generally parallel spacers of a cellular elastic polyurethane rubber between said walls and bonded to the top wall, said spacers being laterally separated until they are compressed vertically an amount not substantially less than about 5 percent of their normal height and moving into engagement before they are compressed substantially more than about 25 percent of said height.

2. A cushion having a generally horizontal flexible top wall, a bottom wall substantially parallel to said top wall, and a plurality of laterally spaced spacers of cellular elastic polyurethane rubber extending between said walls and bonded to said top wall, the surfaces defining the spaces between certain of said spacers being inclined in one direction and the surfaces defining the spaces between other of said spaces being inclined in the opposite direction to minimize relative horizontal movement between said walls, said spacers having an average width less than half that of the spacers so that adjacent spacers move into engagement between said walls when they are compressed substantially, said spaces having a minimum horizontal width such that the height of the adjacent spacers must be reduced not substantially less than about 5 percent before the spacers move into engagement.

3. A cushion comprising generally parallel top and bottom walls, said top wall being generally horizontal and of a cellular elastic material, and a plurality of cellular elastic polyurethane rubber spacers of generally trapezoidal cross-section extending between said walls and having top and bottom portions of different widths, the wide portion of one spacer being adjacent to the narrow portion of the neighboring spacer, the side faces of said spacers being inclined about 15 to 45 degrees relative to the vertical, adjacent spacers being laterally separated by an average distance not substantially greater than about half their average horizontal width so that the spacers expand laterally into engagement when subjected to substantial loads, the spaces between the spacers having a sufficient horizontal width so that the height of the spacers must be reduced at least about 5 percent before the spacers move into engagement.

4. A mattress or the like comprising flexible top and bottom walls and a plurality of laterally spaced generally parallel spacers of cellular elastic polyurethane rubber extending between said walls and held in a predetermined spaced relation, said spacers having top and bottom portions of different width and being arranged with the wide portion of each spacer opposite the narrow portion of the adjacent spacer so that the surfaces defining the spaces between the spacers are inclined in opposite directions to minimize relative horizontal movements between said top and bottom walls, said spaces having an average width in the neighborhood of about 10 to 20 percent of the average width of said spacers.

5. A cushion having generally parallel flexible top and bottom walls and a plurality of laterally spaced spacers of generally trapezoidal cross section extending from the top wall to the bottom wall, said top wall and said spacers being of cellular elastic polyurethane rubber, the spaces between said spacers having an average width that is not substantially greater than about one-half the average width of the spacers so that adjacent spacers expand laterally into engagement when subjected to a substantial load.

6. A mattress or other cushion comprising top and bottom walls of a flexible cellular elastic rubber-like material and a plurality of spacers of cellular elastic polyurethane rubber extending between and bonded to said walls, said spacers having a generally trapezoidal cross section and arranged with the wide portion of each spacer adjacent the narrow portion of the adjacent spacer, said spacers being laterally separated so that the height of adjacent spacers must be reduced by compression not substantially less than about 5 percent before said spacers expand into engagement, adjacent spacers expanding laterally into engagement when their height is reduced an amount not substantially greater than about 25 percent.

7. A mattress or the like comprising flexible cellular elastic top and bottom walls and a plurality of cellular elastic spacers of generally trapezoidal cross section extending between said walls and bonded thereto so as to be held in a predetermined spaced relation with their adjacent sides parallel to form spaces between the spacers with a substantially uniform width in the neighborhood of about 10 to 20 percent of the average width of said spacers.

8. A mattress for supporting a person in a reclining position comprising flexible top and bottom walls made of a cellular elastic polyurethane rubber, a plurality of generally parallel polyurethane cellular elastic spacers having a generally trapezoidal cross section, said spacers being cemented to said top wall and located between said top and bottom walls, said spacers being laterally separated by a distance that is not substantially greater than about half the average width of the spacers in their normal unstressed condition, said spacers being laterally separated by a greater distance in the foot and head regions of said mattress than in the region of said mattress wherein the hips and shoulders of said person would be supported.

9. A mattress or the like as defined in claim 1 wherein the spacers are equally spaced along the length of the mattress.

References Cited in the file of this patent

UNITED STATES PATENTS 2,617,751     Bickett _____ Nov. 11, 1952

FOREIGN PATENTS 45,579     France _____ Aug. 5, 1935
(1st addition to 782,886)